(12) United States Patent
Kalamatianos et al.

(10) Patent No.: US 9,304,919 B2
(45) Date of Patent: Apr. 5, 2016

(54) DETECTING MULTIPLE STRIDE SEQUENCES FOR PREFETCHING

(71) Applicant: Advanced Micro Devices, Inc., Sunnyvale, CA (US)

(72) Inventors: John Kalamatianos, Arlington, MA (US); Paul E. Keltcher, Lexington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 212 days.

(21) Appl. No.: 13/907,209

(22) Filed: May 31, 2013

(65) Prior Publication Data

US 2014/0359221 A1 Dec. 4, 2014

(51) Int. Cl.
*G06F 12/08* (2006.01)

(52) U.S. Cl.
CPC ........ *G06F 12/0811* (2013.01); *G06F 12/0862* (2013.01); *G06F 2212/6026* (2013.01)

(58) Field of Classification Search
None
See application file for complete search history.

(56) References Cited

U.S. PATENT DOCUMENTS 7,831,800 B2   11/2010   Kocev

*Primary Examiner* — Daniel Tsui

(57) ABSTRACT

The present application describes some embodiments of a prefetcher that tracks multiple stride sequences for prefetching. Some embodiments of the prefetcher implement a method including generating a sum-of-strides for each of a plurality of stride lengths that are larger than one by summing a number of previous strides that is equal to the stride length. Some embodiments of the method also include prefetching data in response to repetition of one or more of the sum-of-strides for one or more of the plurality of stride lengths.

20 Claims, 6 Drawing Sheets

| CYCLE | STRIDE | ADDRESS | SOS-2 | SOS-3 | SOS-4 | SOS-5 | ACTION |
|---|---|---|---|---|---|---|---|
| 0 | 0 | A | 0 | 0 | 0 | 0 | |
| 1 | +2 | A+2 | 2 | 2 | 2 | 2 | |
| 2 | +2 | A+4 | 4 | 4 | 4 | 4 | |
| 3 | +3 | A+7 | 5 | 7 | 7 | 7 | |
| 4 | +3 | A+10 | 6 | 8 | 10 | 10 | |
| 5 | +3 | A+13 | 6 | 9 | 11 | 13 | SOS-2 A+19 |
| 6 | +2 | A+15 | 5 | 8 | 11 | 13 | SOS-5 A+28 |
| 7 | +2 | A+17 | 4 | 7 | 10 | 13 | SOS-5 A+30 |
| 8 | +3 | A+20 | 5 | 7 | 10 | 13 | SOS-5 A+33 |
| 9 | +3 | A+22 | 6 | 8 | 10 | 13 | SOS-5 A+36 |
| 10 | +3 | A+26 | 6 | 9 | 11 | 13 | SOS-5 A+39 |
| 11 | +2 | A+28 | 5 | 8 | 11 | 13 | SOS-5 A+41 |
| ⋮ | | | | | | | |

FIG. 3

| CYCLE | STRIDE | ADDRESS | SOS-2 | SOS-5 | CF-2 | CF-5 | ACTION |
|---|---|---|---|---|---|---|---|
| 0 | 0 | A | 0 | 0 | 0 | 0 | |
| 1 | +2 | A+2 | 2 | 2 | 0 | 0 | |
| 2 | +2 | A+4 | 4 | 4 | 0 | 0 | |
| 3 | +3 | A+7 | 5 | 7 | 0 | 0 | |
| 4 | +3 | A+10 | 6 | 10 | 0 | 0 | |
| 5 | +3 | A+13 | 6 | 13 | 1 | 0 | |
| 6 | +2 | A+15 | 5 | 13 | 0 | 1 | |
| 7 | +2 | A+17 | 4 | 13 | 0 | 2 | SOS-5 A+30 |
| 8 | +3 | A+20 | 5 | 13 | 0 | 2 | SOS-5 A+33 |
| 9 | +3 | A+22 | 6 | 13 | 0 | 2 | SOS-5 A+36 |
| 10 | +3 | A+26 | 6 | 13 | 1 | 2 | SOS-5 A+39 |
| 11 | +2 | A+28 | 5 | 13 | 0 | 2 | SOS-5 A+41 |
| ⋮ | | | | | | | |

FIG. 4

DETECTING MULTIPLE STRIDE SEQUENCES FOR PREFETCHING

FIELD OF THE DISCLOSURE

This application relates generally to processing systems, and, more particularly, to detecting multiple stride sequences for prefetching in processing systems.

BACKGROUND

Processing systems typically implement a hierarchical cache complex, e.g., a cache complex that includes an L2 cache and one or more L1 caches. For example, in a processing system that implements multiple processor cores, each processor core may have an associated L1 instruction (L1-I) cache and an L1 data (L1-D) cache. The L1-I and L1-D caches may be associated with a higher level L2 cache. When an instruction is scheduled for processing by the processor core, the processor core first attempts to fetch the instruction for execution from the L1-I cache, which returns the requested instruction if the instruction is resident in a cache line of the L1-I cache. However, if the request misses in the L1-I cache (because the requested instruction is not stored there), the request is forwarded to the L2 cache. If the request hits in the L2 cache (because the requested instruction is stored there), the L2 cache returns the requested line to the L1-I cache. Otherwise, the L2 cache may request the line from a higher-level cache or main memory. Similarly, the processor core may attempt to fetch data used by the instruction from the L1-D cache, which returns the requested data if it is resident in a cache line of the L1-D cache. Otherwise, the data may be requested from a higher-level cache or main memory.

Many programs that are executed on a processing device issue instructions that reference memory locations in a repeating pattern. For example, a program may include a sequence of load or store instructions that access memory locations that are separated by the same number of bytes. Performance of the processing device can be improved by predicting one or more future accesses based on access patterns in the address stream of previous accesses. Data from the predicted memory locations can be pre-fetched from the main memory (or a higher level cache) into one or more caches such as the L1-D cache so that the data is available in the cache if subsequent instructions access the predicted memory location.

An access pattern can be defined by a stride sequence that indicates the number of bytes (typically referred to as the stride) between addresses of successive memory accesses in the access pattern. The stride sequence for the access pattern may only include one value when each memory location is separated from the previous memory location by a constant number of bytes. For example, the address stream may access the addresses A, A+16, A+32, A+48, A+64, etc. The stride sequence for this address stream is therefore +16 and the stride sequence has a length of 1. The stride sequence for a sequence of instructions may also include more than one stride. For example, the address stream may access the addresses A, A+16, A+24, A+40, A+48, A+64, A+72, A+88, A+96, etc. The stride sequence for this address stream is therefore +16, +8 and the stride sequence has a length of 2 because it includes two different strides.

BRIEF DESCRIPTION OF THE DRAWINGS

FIG. 3 is a diagram of the prefetch table contents that may be used as the prefetch table shown in FIG. 2, according to some embodiments;

FIG. 4 is a diagram of the prefetch table contents that may be used as the prefetch table shown in FIG. 2, according to some embodiments;

DETAILED DESCRIPTION

As discussed herein, a prefetcher can be used to identify stride sequences and then prefetch data into a cache based on the stride sequence. However, many programs generate complicated stride sequences that would not be recognized by conventional prefetchers. For example, benchmarking programs are known to generate address streams that include stride sequences that have lengths that are greater than or equal to 2. For another example, loads or stores found inside of nested loops frequently generate multiple stride sequences in a sub pattern that includes strides of +x bytes that are repeated S times followed by strides of +y bytes that are repeated one time. The stride sequence generated by nested loops of this form would therefore have a length of S+1. Additional levels of nesting can create longer stride sequences. Conventional prefetchers are not able to track stride sequences that are equal to or longer than 2.

FIGS. 1-5 describe embodiments of prefetchers that can detect and track a set of multiple stride sequences that have lengths ranging from 2 up to N. As used herein, the term "multiple stride sequence" refers to stride sequences that include more than one stride. Some embodiments of the prefetcher may detect and track a set of multiple stride sequences by calculating a sum-of-strides for each multiple stride sequence. For example, the sum-of-strides for the different multiple stride sequences can be calculated by summing the strides of a number of previous instructions that is equal to the stride length of each of the multiple stride sequences. As used herein, the term "stride length" refers to the number of strides in a stride sequence. Some embodiments may calculate the sum-of-strides for each stride length (L) by adding the stride of the current instruction to the sum-of-strides for the stride sequence that has the next shorter stride length (L−1).

A prefetch request can be issued when the value of the sum-of-strides for one or more of the stride sequences is repeated for a predetermined number of cycles or instructions. The address of the prefetch request is set equal to the address of the most recent instruction incremented by the repeated value of the sum-of-strides. If more than one value of the sum-of-strides for multiple stride sequences is repeated for the same instruction, some embodiments may select the repeated value of the sum-of-strides corresponding to the longest stride sequence. Performance of the processing device can be improved by tracking multiple sums-of-strides of varying lengths and then issuing prefetch requests that are determined based on a repeating sum-of-strides, at least in part because this allows the prefetcher to recognize more complex access patterns.

Figure 1:
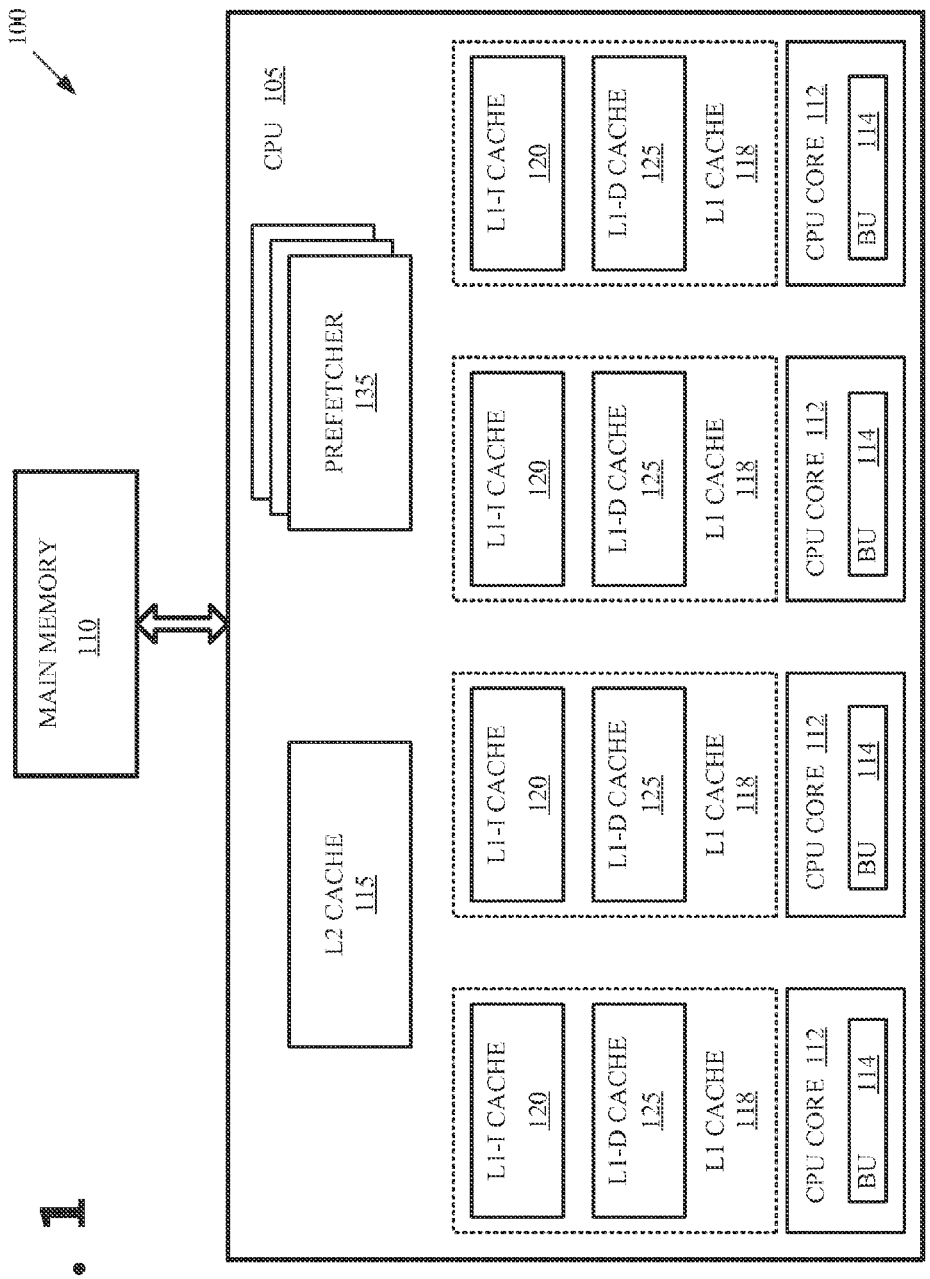
FIG. 1 is a block diagram of a processing device that may be formed in or on a semiconductor wafer, according to some embodiments.

FIG. 1 is a block diagram of a processing device 100 that may be formed in or on a semiconductor wafer, according to some embodiments. The processing device 100 may be formed in or on the semiconductor wafer using well known processes such as deposition, growth, ion implantation, photolithography, etching, planarizing, polishing, annealing, and the like. Some embodiments of the processing device 100 include a CPU 105 that is configured to access instructions or data that are stored in the main memory 110. The CPU 105 shown in FIG. 1 includes four processor cores 112 that may be used to execute the instructions or manipulate the data. The processor cores 112 may include a bus unit (BU) 114 for managing communication over bridges or buses in the processing system 100. The CPU 105 shown in FIG. 1 also implements a hierarchical (or multilevel) cache complex that is used to speed access to the instructions or data by storing selected instructions or data in the caches. However, persons of ordinary skill in the art having benefit of the present disclosure should appreciate that some embodiments of the device 100 may implement different configurations of the CPU 105, such as configurations that use external caches, different types of processors such as graphics processing units (GPUs) or accelerated processing units (APUs), or different numbers of processor cores 112. Moreover, some embodiments may associate different numbers or types of caches 118, 120, 125 with the different processor cores 112.

The cache complex depicted in FIG. 1 includes a level 2 (L2) cache 115 for storing copies of instructions or data that are stored in the main memory 110. Some embodiments of the L2 cache 115 can be implemented using any associativity including 2-way associativity, 8-way associativity, 16-way associativity, direct mapping, fully associative caches, and the like. Relative to the main memory 110, the L2 cache 115 may be implemented using faster memory elements. The L2 cache 115 may also be deployed logically or physically closer to the processor core 112 (relative to the main memory 110) so that information may be exchanged between the CPU core 112 and the L2 cache 115 more rapidly or with less latency.

The illustrated cache complex also includes L1 caches 118 for storing copies of instructions or data that are stored in the main memory 110 or the L2 cache 115. Each L1 cache 118 is associated with a corresponding processor core 112. The L1 cache 118 may be implemented in the corresponding processor core 112 or the L1 cache 118 may be implemented outside the corresponding processor core 112 and may be physically, electromagnetically, or communicatively coupled to the corresponding processor core 112. Relative to the L2 cache 115, the L1 cache 118 may be implemented using faster memory elements so that information stored in the lines of the L1 cache 118 can be retrieved quickly by the corresponding processor core 112. The L1 cache 118 may also be deployed logically or physically closer to the processor core 112 (relative to the main memory 110 or the L2 cache 115) so that information may be exchanged between the processor core 112 and the L1 cache 118 more rapidly or with less latency (relative to communication with the main memory 110 or the L2 cache 115).

Some embodiments of the L1 caches 118 are separated into caches for storing instructions and data, which are referred to as the L1-I cache 120 and the L1-D cache 125. Separating or partitioning the L1 cache 118 into an L1-I cache 120 for storing instructions and an L1-D cache 125 for storing data may allow these caches to be deployed closer to the entities that are likely to request instructions or data, respectively. Consequently, this arrangement may reduce contention, wire delays, and generally decrease latency associated with instructions and data. A replacement policy dictates that the lines in the L1-I cache 120 are replaced with instructions from the L2 cache 115 and the lines in the L1-D cache 125 are replaced with data from the L2 cache 115. However, persons of ordinary skill in the art should appreciate that some embodiments of the L1 caches 118 may be partitioned into different numbers or types of caches that operate according to different replacement policies. Furthermore, persons of ordinary skill in the art should appreciate that some programming or configuration techniques may allow the L1-I cache 120 to store data or the L1-D cache 125 to store instructions, at least on a temporary basis.

The L2 cache 115 illustrated in FIG. 1 is inclusive so that cache lines resident in the L1 caches 118, 120, 125 are also resident in the L2 cache 115. Persons of ordinary skill in the art having benefit of the present disclosure should appreciate that the L1 caches 118 and the L2 cache 115 represent one example embodiment of a multi-level hierarchical cache memory system. However, some embodiments may use different multilevel caches including elements such as L0 caches, L1 caches, L2 caches, L3 caches, and the like, some of which may or may not be inclusive of the others.

In operation, because of the low latency, a core 112 first checks its corresponding L1 caches 118, 120, 125 when it needs to retrieve or access an instruction or data. If the request to the L1 caches 118, 120, 125 misses, then the request may be directed to the L2 cache 115, which can be formed of a relatively slower memory element than the L1 caches 118, 120, 125. The main memory 110 is formed of memory elements that are slower than the L2 cache 115. For example, the main memory may be composed of denser (smaller) DRAM memory elements that take longer to read and write than the SRAM cells typically used to implement caches. The main memory 110 may be the object of a request in response to cache misses from both the L1 caches 118, 120, 125 and the inclusive L2 cache 115. The L2 cache 115 may also receive external probes, e.g. via a bridge or a bus, for lines that may be resident in one or more of the corresponding L1 caches 118, 120, 125.

Some embodiments of the CPU 105 include one or more prefetchers 135 for prefetching instructions or data into one or more of the caches 115, 118, 120 125 before the data has been requested by one of the CPU cores 112. For example, one of the prefetchers 135 can detect patterns in the addresses associated with reads of main memory 110 and use the detected patterns to predict the addresses associated with future reads. The data at these addresses can then be prefetched from the main memory 110 (or the L2 cache 115 or other higher level cache) into the L1-D cache 125 associated with the requesting CPU core 112. Some embodiments of the prefetchers 135 can track strides on subgroups of addresses. For example, the data address stream generated by the CPU cores 112 may be partitioned based on an instruction pointer (RIP), a physical page that includes the address, or other criteria. Each prefetcher 135 may then track addresses in the data stream associated with one or more of the partitions. Tracking strides on subgroups of addresses may improve the accuracy of the tracking algorithm.

The prefetchers 135 shown in FIG. 1 can track a set of multiple stride sequences that have lengths ranging from 2 up to N by calculating a sum-of-strides for each multiple stride sequence. For example, the sum-of-strides for multiple stride sequences having stride lengths that range from 2 to 5 can be calculated by summing the strides of a number of previous instructions that is equal to the stride length of each of the multiple stride sequences, e.g., the sum-of-strides for the multiple stride sequence having a stride length of 2 sums the most recent two strides, the sum-of-strides for the multiple stride sequence having a stride length of 3 sums the most recent three strides, etc. The prefetchers 135 may then issue a prefetch request when the value of the sum-of-strides for one or more of the stride sequences is repeated for a predetermined number of cycles or instructions.

Figure 2:
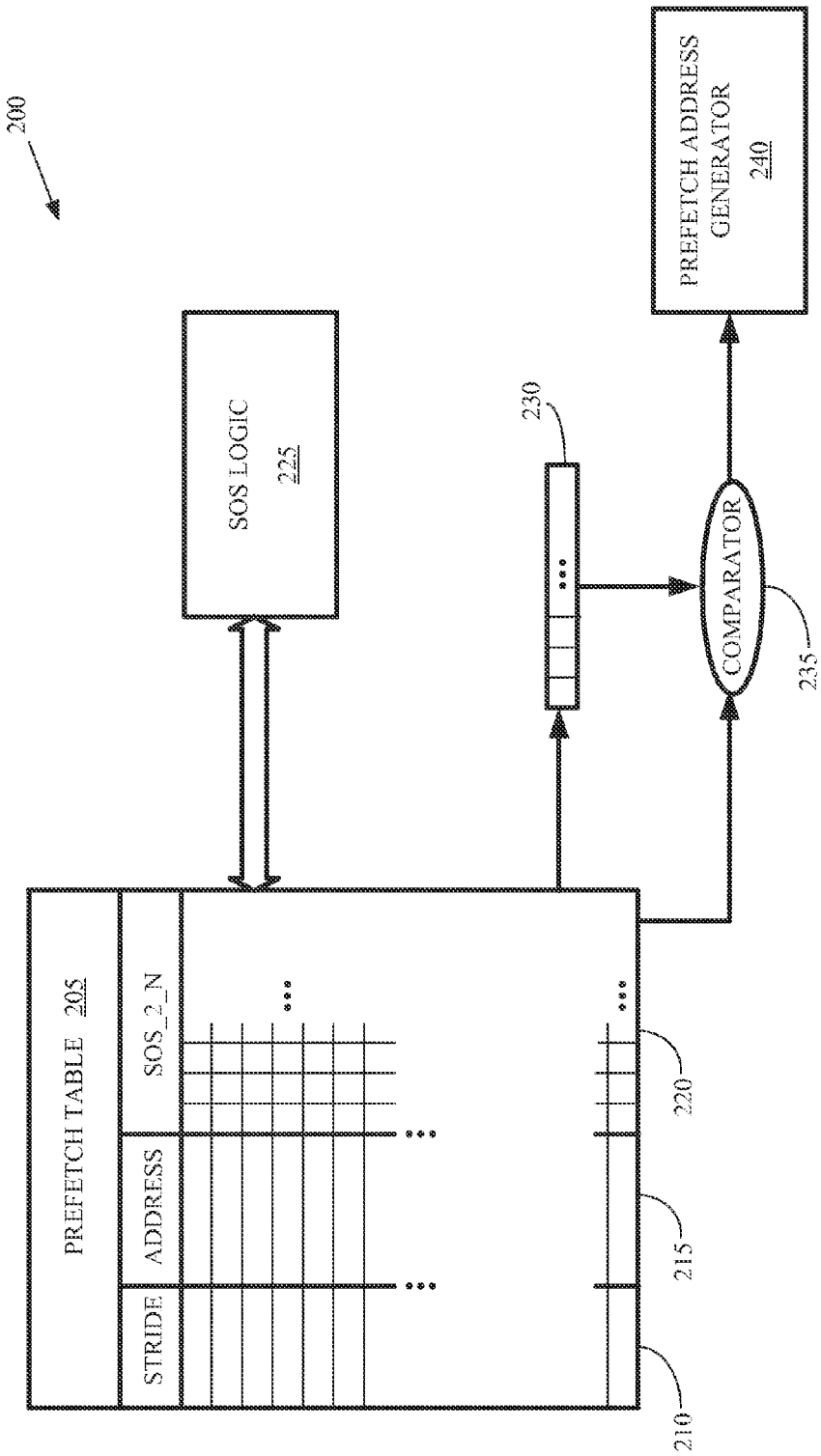
FIG. 2 is a block diagram of a prefetcher that may be used as one of the prefetchers shown in FIG. 1, according to some embodiments.

FIG. 2 is a block diagram of a prefetcher 200 that may be used as one of the prefetchers 135 shown in FIG. 1, according to some embodiments. The prefetcher 200 includes a data structure such as a prefetch table 205 that is used to store the sum-of-strides and other information for a group of multiple stride sequences. For example, the prefetch table 205 may include a column 210 indicating the current stride that is calculated with each instruction, a column 215 indicating the addresses accessed by the instruction, and columns 220 including the sums-of-strides for the multiple stride sequences of different stride lengths (SOS_2_N). The columns 220 may also include other information such as information indicating confidence levels for the sum-of-strides for the multiple stride sequences. In some embodiments, the strides or sum-of-strides may have positive values, negative values, or a mixture of positive and negative values depending on the patterns in the data address stream.

Logic 225 in the prefetcher 200 can be used to read strides, addresses, and sum-of-strides from past instructions. These values come from the stride column 210, the address column 215, and the sum-of-strides column 220, respectively. The logic 225 also implements a sum-of-strides algorithm that can compute the sum-of-strides for each of the multiple stride sequences using the information stored in the prefetch table 205. For example, if X is the new address and Y is the most recent address previously seen in the data address stream of interest, the sum-of-strides logic 225 can compute new values (new SOS) for the sum-of-strides of each multiple stride sequence of stride length (i) using:

$$\text{new SOS}_i = (X - Y) + \text{old SOS}_{i-1}, \quad (1)$$

where old $SOS_{i-1}$ is the old value of the sum-of-strides for the multiple stride sequence having the next shorter stride length (i−1). By definition, the value of $SOS_1$ is the value of the stride from the previous instruction.

Some embodiments of the prefetcher 200 include flip-flops 230 to hold values of the sum-of-strides for each of the multiple stride sequences recorded in the prefetch table 205. Values of the sum-of-strides for the multiple stride sequences can therefore be read out into the flip-flops 230 before updating the values of the sum-of-strides for the current cycle. The sum-of-strides algorithm 225 can then compute the new values of the sum-of-strides using information from the prefetch table 205. Some embodiments may compute the new values by reading the old values of the sum-of-strides out of the prefetch table 205, storing them in flip-flops 230, and then generating the new sum-of-strides in parallel because each new sum-of-strides only depends on the newly generated stride and one old sum-of-strides value. If needed, the individual strides can be determined by subtracting the old sum-of-strides from the new sum-of-strides.

The prefetcher 200 can also use the information in the prefetch table 205 to detect repeated values of the sum-of-strides for the multiple stride sequences. For example, a comparator 235 may read the previously stored values of the sum-of-strides from the flip-flops 230 and compare them to current values of the sum-of-strides stored in the column 220 of the prefetch table 205. A match between the previously stored values and the current values indicates that the sum-of-strides for the corresponding multiple stride sequence has repeated. Repeating values of the sum-of-strides for a multiple stride sequence may indicate that the prefetcher 200 has detected a pattern in the data address stream.

A prefetch address generator 240 may be used to generate prefetch addresses associated with one or more multiple stride sequences detected by the prefetcher 200. Some embodiments of the comparator 235 can signal the prefetch address generator 240 when repeating values of the sum-of-strides for one or more multiple stride sequences have been detected. The signal provided to the prefetch address generator 240 may include information identifying the addresses, strides, or sum-of-strides for multiple stride sequences that have repeating values of their corresponding sum-of-strides. The prefetch address generator 240 may then generate a request to prefetch data from an address that is determined based upon address, stride, and sum-of-strides information. For example, prefetch address generator 240 may generate an address for a prefetch request at the current address incremented by the repeating value of the sum-of-strides. The prefetch address generator 240 may then issue a request to prefetch data from the generated address. In cases where more than one multiple stride sequence has a repeating sum-of-strides in the same cycle, the prefetch address generator 240 may generate a prefetch address for the multiple stride sequence that has the longest stride length. Issuing the prefetch request for the multiple stride sequence with the longest stride length may allow the prefetcher 200 to prefetch the address that is furthest ahead in the stride sequence, which may improve the timeliness of the prefetch requests.

FIG. 3 is a diagram of a prefetch table 300 showing the contents of the prefetch table 205 shown in FIG. 2, according to some embodiments. The prefetch table 300 includes a CYCLE column that indicates the clock cycle during which a new address is generated in the data address stream, a STRIDE column that indicates the stride from the previous access to the current access, an ADDRESS column that indicates the address generated in the current cycle, and sum-of-strides columns for multiple stride sequences that have stride lengths of 2 to 5 (SOS-2 . . . SOS-5). Persons of ordinary skill in the art having benefit of the present disclosure should appreciate that some embodiments of the prefetch table 300 may include more or fewer sum-of-strides columns to monitor multiple stride sequences that have more or fewer stride lengths. The prefetch table 300 also includes an ACTION column that indicates whether a prefetch request was issued in the current cycle and, if so, the multiple stride sequence that generated the prefetch request and the address of the prefetch request. However, some embodiments of the prefetch table 300 may not include the ACTION column. Furthermore, in the interest of clarity, entries in the prefetch table 300 are listed for consecutive clock cycles. However, persons of ordinary skill in the art having benefit of the present disclosure should appreciate that entries are added to the prefetch table 300 in response to addresses being generated for instructions. Thus, some embodiments of the prefetch table 300 may not have entries for every clock cycle if no addresses were generated during some clock cycles.

Cycles 0-4 may be part of a warm-up period for the prefetch table 300. For example, at cycle 0, only one instruction may have accessed data at address A. The sum-of-strides for all of the multiple stride sequences may therefore be set to 0. At cycle 1, the next instruction accesses data at address A+2 so that the current value of the stride is +2 and the sum-of-strides for all of the multiple stride sequences is set to 2. The sum-of-strides values for each successive cycle can be updated, e.g., according to equation 1. For example, the sum-of-strides values for the multiple stride sequence of length 5 (SOS-5) in the cycle 5 can be set equal to the sum-of-strides values of SOS-4 in cycle 4 incremented by the stride in cycle 5. The value of SOS-5 in cycle 5 is therefore 10+3=13. Since there is no SOS-1 value, the value of SOS-2 may be calculated by adding the current stride to the previous stride. In FIG. 3, the previous stride is the stride value shown in the previous cycle but in some embodiments the previous stride is the one stored in the STRIDE column.

The value of SOS-2 repeats in cycle 5, e.g., the value of SOS-2 is 6 in cycle 4 and cycle 5. A prefetcher associated with the prefetch table 300 (such as the prefetcher 200 shown in FIG. 2) may therefore issue a prefetch request in response to repetition of the value of SOS-2. Some embodiments may issue the prefetch request to an address equal to the current address plus the repeating value of the sum-of-strides for SOS-2, e.g., A+13+6=A+19, as indicated in the ACTION column for cycle 5.

The values of SOS-4 and SOS-5 both repeat in cycles 5 and 6. The prefetcher may therefore issue a prefetch request associated with the multiple stride sequence having the longest stride length. The prefetch request may be issued for an address equal to the current address plus the repeating value of the sum-of-strides for the longest multiple stride sequence with a repeating sum-of-strides (SOS-5 in this case), e.g., A+15+13=A+28. Prefetch requests associated with the shorter multiple stride sequences with a repeating sum-of-strides (SOS-4) may therefore be gated so that they are not issued. Bypassing the prefetch requests associated with the shorter multiple stride sequences may allow the prefetcher to issue prefetch requests for the addresses that will be referenced furthest in the future because the length of the stride sequence is proportional to the number of memory instructions that generate addresses. In this embodiment shown in FIG. 3, the data for cycles 7-10 is not prefetched and demand requests may be used to get the data at these addressees. If the pattern of addresses in the stream holds true for many more cycles, the prefetcher may eventually lock in to the exact pattern and prefetch substantially all the subsequent addresses in the stream.

FIG. 4 is a diagram of a prefetch table 400 shows the contents of the prefetch table 205 shown in FIG. 2, according to some embodiments. The prefetch table 400 includes a CYCLE column, a STRIDE column, an ADDRESS column, and sum-of-strides columns for multiple stride sequences that have stride lengths of 2-5 (SOS-2 . . . SOS-5) such as the corresponding columns in the prefetch table 300 shown in FIG. 3. However, the prefetch table 400 also includes confidence columns including information that indicates a confidence level associated with each of the multiple stride sequences (CF-2 . . . CF-5). For example, the confidence columns may include counters that are incremented each time the corresponding sum-of-strides repeats. The information in the confidence columns may be used to filter out unnecessary prefetch requests that can be generated during warm-up of the prefetch table 400.

A prefetcher associated with the prefetch table 400 (such as the prefetcher 200 shown in FIG. 2) may issue a prefetch request in response to repetition of the value of SOS-2 when the corresponding confidence value is above a predetermined threshold. For example, prefetch requests may be issued when the confidence level is 2 or higher, indicating that the corresponding sum-of-strides has maintained the same value for at least three consecutive addresses. In cycle 5, the sum-of-strides for the multiple stride sequence having a stride length of 5 (SOS-5) has a value of 13, which is not yet been repeated. The confidence level for SOS-5 is therefore set to 0 in cycle 5. The value of SOS-5 repeats in cycle 6 and so the confidence level for SOS-5 is set to 1, which is less than the threshold of 2 and so no prefetch request is issued. In cycle 7, SOS-5 repeats again and so the confidence level for SOS-5 is set to 2, which is equal to the threshold of 2. The prefetcher may therefore issue a prefetch request to an address equal to the current address incremented by SOS-5, e.g., A+17+13=A+30. The value of the confidence level may be decremented when the sum-of-strides does not repeat in a cycle. For example, in cycle 5, the confidence level for SOS-2 is 1 but SOS-2 does not repeat in cycle 6 and so the confidence level for SOS-2 is decremented to 0.

Figure 5:
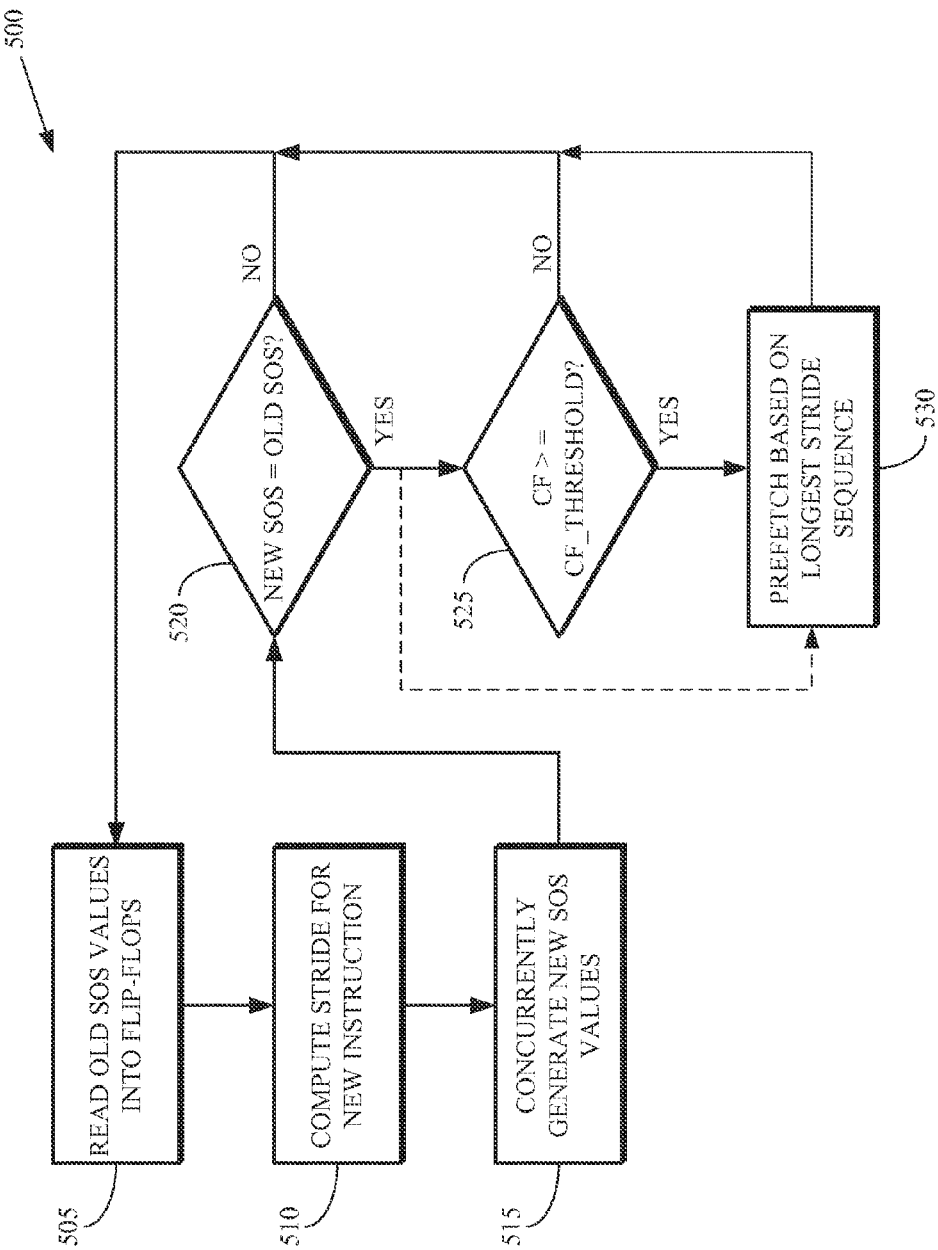
FIG. 5 is a flow diagram of a method for detecting multiple stride sequences and issuing prefetch requests based on the detected multiple stride sequences, according to some embodiments.

FIG. 5 is a flow diagram of a method 500 for detecting multiple stride sequences and issuing prefetch requests based on the detected multiple stride sequences, according to some embodiments. Some embodiments of the method 500 may be implemented in prefetchers, such as the prefetcher 200 shown in FIG. 2. At block 505, the sum-of-strides values from the previous address are read out of a prefetch table in the prefetcher and into flip-flops or other memory locations or structures. At block 510, the prefetcher computes the stride for a new instruction in the current cycle, e.g., by reading the address of the previous instance from the prefetcher table entry and subtracting it from the address of a memory location accessed by the new instruction during the current cycle. At block 515, the prefetcher concurrently generates new sum-of-strides for a plurality of multiple stride sequences. For example, the prefetcher may calculate the new sum-of-strides for the plurality of multiple stride sequences in parallel using the stride computed at block 510 and the old sum-of-strides values stored in flip-flops at block 505.

The new sum-of-strides are compared with the old sum-of-strides at block 520. If none of the sum-of-strides for the multiple stride sequences repeats, then the method 500 may be finished for the current cycle and may return to block 505 to read the old sum-of-strides values into flip-flops in response to a new address to a memory location being generated. If one or more of the sum-of-strides for one or more of the multiple stride sequences repeats, then at least one prefetch request can be issued. Some embodiments of the prefetcher use a confidence level to determine whether to issue a prefetch request. This step is optional and so block 525 may be bypassed, as indicated by the dashed line to block 530. At block 525, the prefetcher may therefore determine whether a confidence level associated with one or more of the multiple stride sequences is greater than or equal to the confidence level threshold for the multiple stride sequence. If not, then the method 500 may be finished for the current cycle and may return to block 505 to read the old sum-of-strides values into flip-flops in response to a new address to a memory location being generated. If so, then the prefetcher may issue a prefetch at block 530 based on the longest stride sequence that had a repeating sum-of-strides in the current cycle, as discussed herein. The method 500 may then be finished for the current cycle and may return to block 505 to read the old sum-of-strides values into flip-flops in response to a new address to a memory location being generated.

Embodiments of the techniques described herein provide the ability to track and detect more than one multiple stride sequence that may have different stride lengths. The hardware cost of embodiments that implement embodiments of the techniques described herein include maintaining sum-of-strides values for each of the multiple stride sequences (e.g., in a prefetch table such as the prefetch table 200 shown in FIG. 2). The number of bits used to track the sum-of-strides values may depend on the minimum and maximum values of the stride lengths that are being monitored by the prefetcher. For example, if the total range (M) of stride lengths is M=abs (maximum stride length)+abs (minimum stride length)+1, then the number of bits used to track each sum-of-strides is log 2(M). Embodiments that use a confidence level to decide when to prefetch data based on a multiple stride sequence may include additional bits for a counter used to represent the confidence level associated with each multiple stride sequence. The hardware cost of embodiments described herein is therefore significantly lower than the hardware cost of techniques that track multiple stride sequences by tracking each individual stride. Embodiments of the techniques herein are also able to detect and prefetch based on more complicated patterns that would not be detected by conventional prefetcher algorithms. These embodiments may therefore provide more coverage because conventional prefetchers would not issue prefetch requests because the confidence level for the request may be degraded when the prefetcher encounters multiple stride. Embodiments of the techniques described herein may also prefetch with better accuracy because the techniques described herein can track more complex patterns and may not issue prefetch requests for single stride sequences that are embedded in multiple stride sequences. Embodiments of the techniques described herein may also compute the prefetch address in a shorter period of time because they only need one level of computation to find the sum of strides for any multiple stride sequence tracked in the prefetcher table, as opposed to computing the sum of strides by adding together all the recorded strides in a sequence if the prefetcher table was recording the actual strides, instead of the sum of strides.

Figure 6:
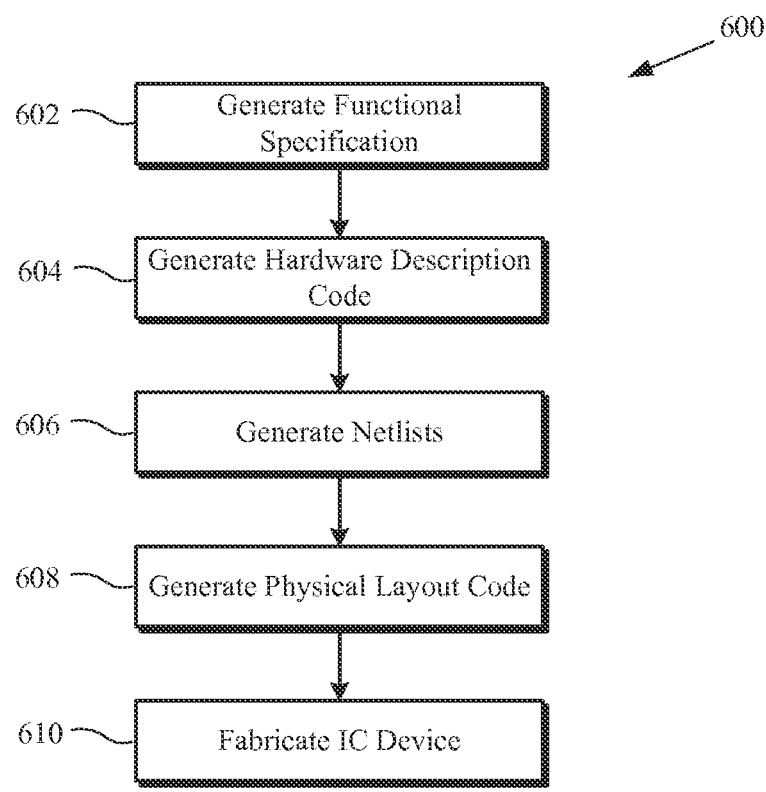
FIG. 6 is a flow diagram illustrating an example method for the design and fabrication of an IC device implementing one or more aspects, according to some embodiments.

FIG. 6 is a flow diagram illustrating an example method 600 for the design and fabrication of an IC device implementing one or more aspects, according to some embodiments. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. Some embodiments of the hardware description code are represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable medium) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    generating a sum-of-strides for each of a plurality of stride lengths that are larger than one by summing a number of previous strides that is equal to the stride length; and
    prefetching data in response to repetition of at least one of the sum-of-strides for at least one of the plurality of stride lengths.

2. The method of claim 1, wherein generating the sum-of-strides for each of the plurality of stride lengths comprises adding a stride of a current address to the sum-of-strides for the next shorter stride length.

3. The method of claim 1, comprising comparing the sum-of-strides for each of the plurality of stride lengths to previously stored values of the sum-of-strides for each of the plurality of stride lengths to determine whether said at least one of the sum-of-strides has repeated.

4. The method of claim 1, wherein prefetching the data comprises generating a prefetch address by adding said at least one repeated sum-of-strides to a current address.

5. The method of claim 4, comprising selecting a sum-of-strides for a longest stride length if the sum-of-strides for more than one stride length was repeated.

6. The method of claim 5, wherein generating the prefetch address comprises adding the sum-of-strides for the longest stride length to the address generated by a current instruction.

7. The method of claim 1, comprising incrementing at least one counter in response to said at least one of the sum-of-strides for said at least one of the plurality of stride lengths repeating.

8. The method of claim 7, wherein prefetching the data comprises prefetching the data in response to said at least one counter exceeding a threshold value.

9. The method of claim 7, comprising decrementing said at least one counter in response to said at least one of the sum-of-strides for said at least one of the plurality of stride lengths not repeating.

10. A prefetcher, comprising:
    a prefetch table for storing a sum-of-strides for each of a plurality of stride lengths that are larger than one, wherein each sum-of-strides is generated by summing a number of previous strides that is equal to the stride length, and wherein the prefetcher prefetches data in response to repetition of at least one of the sum-of-strides for at least one of the plurality of stride lengths.

11. The prefetcher of claim 10, wherein the prefetcher generates the sum-of-strides for each of the plurality of stride lengths by adding a stride for a currently generated address to the sum-of-strides for the next shorter stride length.

12. The prefetcher of claim 10, comprising a plurality of flip-flops to store sum-of-strides for each of the plurality of stride lengths and a comparator to compare the sum-of-strides for each of the plurality of stride lengths to previously stored sum-of-strides for each of the plurality of stride lengths to determine whether said at least one of the sum-of-strides has repeated.

13. The prefetcher of claim 10, comprising an address generator to generate a prefetch address by adding said at least one repeated sum-of-strides to an address generated in the current cycle.

14. The prefetcher of claim 13, wherein the address generator selects a sum-of-strides for a longest stride length in response to repetition of the sum-of-strides for more than one stride length.

15. The prefetcher of claim 14, wherein the addresses generator adds the sum-of-strides for the longest stride length to the address generated by an instruction in a current cycle.

16. The prefetcher of claim 10, comprising at least one counter that is incremented in response to said at least one of the sum-of-strides for said at least one of the plurality of stride lengths repeating.

17. The prefetcher of claim 16, wherein the prefetcher prefetches the data in response to said at least one counter exceeding a threshold value.

18. The prefetcher of claim 16, wherein said at least one counter is decremented in response to said at least one of the sum-of-strides for said at least one of the plurality of stride lengths not repeating.

19. A non-transitory computer readable medium storing code to adapt at least one computer system to perform a portion of a process to fabricate at least part of a processor comprising:
    a prefetch table for storing a sum-of-strides for each of a plurality of stride lengths that are larger than one, wherein each sum-of-strides is generated by summing a number of previous strides that is equal to the stride length, and wherein the prefetcher prefetches data in response to repetition of at least one of the sum-of-strides for at least one of the plurality of stride lengths.

20. The non-transitory computer readable medium set forth in claim 19, wherein the processor further comprises a plurality of flip-flops to store sum-of-strides for each of the plurality of stride lengths and a comparator to compare the sum-of-strides for each of the plurality of stride lengths to previously stored sum-of-strides for each of the plurality of stride lengths to determine whether said at least one of the sum-of-strides has repeated.

* * * * *